United States Patent
Kwon

(10) Patent No.: US 9,724,983 B2
(45) Date of Patent: Aug. 8, 2017

(54) DEVICE FOR MOVING WINDOW GLASS FOR VEHICLE

(71) Applicant: Hyundai Motor Company, Seoul (KR)

(72) Inventor: Hyuk Jong Kwon, Jeonju-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/918,391

(22) Filed: Oct. 20, 2015

(65) Prior Publication Data

US 2016/0298371 A1   Oct. 13, 2016

(30) Foreign Application Priority Data

Apr. 8, 2015   (KR) .................. 10-2015-0049781

(51) Int. Cl.
| | | |
|---|---|---|
| *E05F 11/48* | (2006.01) | |
| *B60J 1/17* | (2006.01) | |
| *B60J 1/00* | (2006.01) | |
| *B60J 5/04* | (2006.01) | |

(52) U.S. Cl.
CPC ............... *B60J 1/17* (2013.01); *B60J 1/004* (2013.01); *B60J 5/0402* (2013.01); *B60J 5/0408* (2013.01); *E05F 11/488* (2013.01); *E05Y 2201/684* (2013.01); *E05Y 2800/266* (2013.01); *E05Y 2900/55* (2013.01)

(58) Field of Classification Search
CPC ..... E05D 15/165; B60J 5/0402; B60J 5/0408; B60J 1/004; B60J 1/17
USPC .......................................... 49/348, 349, 352
See application file for complete search history.

(56) References Cited

U.S. PATENT DOCUMENTS

| | | | | | |
|---|---|---|---|---|---|
| 2,947,569 | A | * | 8/1960 | McDougall | E05F 11/423 49/227 |
| 2,998,246 | A | * | 8/1961 | Probst | E05F 11/445 49/227 |
| 4,615,143 | A | * | 10/1986 | Isetani | E05F 11/525 49/226 |
| 4,974,363 | A | * | 12/1990 | Reaney | B60J 5/0458 49/374 |
| 4,974,365 | A | * | 12/1990 | Ono | B60J 1/14 49/348 |
| 5,673,515 | A | * | 10/1997 | Weber | E05F 11/385 49/140 |
| 6,526,696 | B2 | * | 3/2003 | Cardine | E05F 11/488 49/227 |
| 6,916,064 | B2 | * | 7/2005 | Bohm | B60J 7/04 296/216.04 |
| 8,444,217 | B2 | * | 5/2013 | Nellen | B60J 7/02 296/216.03 |
| 8,894,137 | B2 | * | 11/2014 | Manders | B60J 7/047 296/216.03 |
| 9,233,599 | B2 | * | 1/2016 | Kriese | B60J 5/0416 |

(Continued)

FOREIGN PATENT DOCUMENTS

| | | |
|---|---|---|
| JP | 5-156861 A | 6/1993 |
| KR | 20-1998-0020695 U | 7/1998 |

(Continued)

*Primary Examiner* — Jerry Redman
(74) *Attorney, Agent, or Firm* — Morgan Lewis & Bockius LLP

(57) ABSTRACT

A device for moving a window glass for a vehicle, may include a glass holder disposed on a door panel for the vehicle and supporting the window glass, and a curved rail guiding vertical movement of the glass holder and curved to form a hinge shaft.

8 Claims, 12 Drawing Sheets

(56) References Cited

U.S. PATENT DOCUMENTS

2005/0115153 A1* 6/2005 Roda .................... B60J 1/17
                                                         49/213
2006/0075685 A1* 4/2006 Gustafson ............. E05F 11/405
                                                         49/349

FOREIGN PATENT DOCUMENTS

| KR | 10-2009-0063820 A | 6/2009 |
| KR | 10-0980948 B1 | 9/2010 |

* cited by examiner

<Prior Art>

<Prior Art>

DEVICE FOR MOVING WINDOW GLASS FOR VEHICLE

CROSS-REFERENCE TO RELATED APPLICATION

The present application is based on and claims the benefit of priority to Korean Patent Application No. 10-2015-0049781, filed on Apr. 8, 2015, the entire contents of which is incorporated herein for all purposes by this reference.

FIELD OF THE INVENTION

The present disclosure relates to a device for moving a window glass for a vehicle, and more particularly, to a device for moving a window glass for a vehicle in which a curvature is formed on a rail mounted in a door so as to guide vertical movement of a door window.

BACKGROUND

There are several types of door glass raising and lowering devices. Recently, among types in which a regulator is modularized, a dual wire-type door window (WDW) regulator has been used in the case in which door glass raising and lowering stability is required or a load burden is large due to a large glass size.

Since the dual wire-type door window regulator includes a rail attached to a module panel mounted in a door panel, it has advantages such as a good assembly property and small movement at the time of raising or lowering a glass.

However, a vehicle such as a large truck 1 illustrated in FIG. 1 has a vertical length of a door 2 longer than those of other vehicles, and has a vertical length of a glass 3 longer than those of other vehicles in order to secure a side sight. In this case, in order to completely raise or lower the glass 3, a length of a rail 5 attached to a module panel 4 should be sufficiently long, as illustrated in FIG. 2.

As illustrated in FIG. 2, the rail 5 attached to the module panel 4 protrudes downwardly of the module panel 4. Therefore, when the module panel 4 is mounted in a door panel 6, the rail 5 contacts the door panel 6, such that there was the possibility that the module panel 4 will be misaligned and inclined.

If considering this point, when the module panel 4 is mounted in the door panel 6, the module panel 4 should be accurately mounted in the door panel 6 after the rail 5 is separated from the module panel 4, and the rail 5 should be again attached to the module panel 4.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a device for moving a window glass for a vehicle capable of preventing a rail from protruding downwardly of a module panel even at the time of mounting a glass having a long vertical length by forming a curvature on the rail.

According to an exemplary embodiment of the present disclosure, a device for moving a window glass for a vehicle includes: a glass holder disposed on a door panel for a vehicle and supporting a window glass, and a curved rail guiding vertical movement of the glass holder and curved to form a hinge shaft.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIGS. 8A and 8B are views illustrating a support plate included in the device for moving a window glass for a vehicle of FIG. 3, wherein FIG. 8A is a perspective view illustrating the support plate, and FIG. 8B is a cut-away perspective view of the support plate of FIG. 8A taken along a central line.

Figure 1:
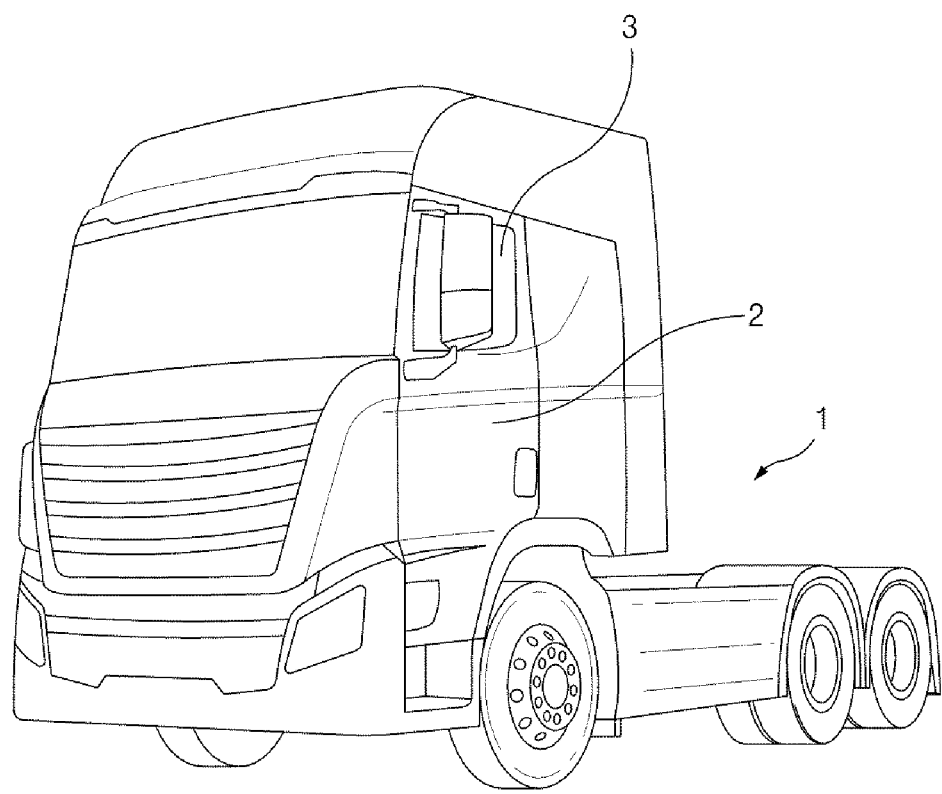
FIG. 1 is a perspective view of a truck to which a dual wire-type door window regulator according to the related art is applied.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of the present disclosure will be described in detail with reference to the accompanying drawings.

Referring to FIGS. 3 to 11, a device for moving a window glass for a vehicle according to an exemplary embodiment of the present disclosure is configured to include a glass holder 400 disposed on a door panel for a vehicle and supporting a window glass G, and a curved rail 200 guiding vertical movement of the glass holder 400.

Figure 2:
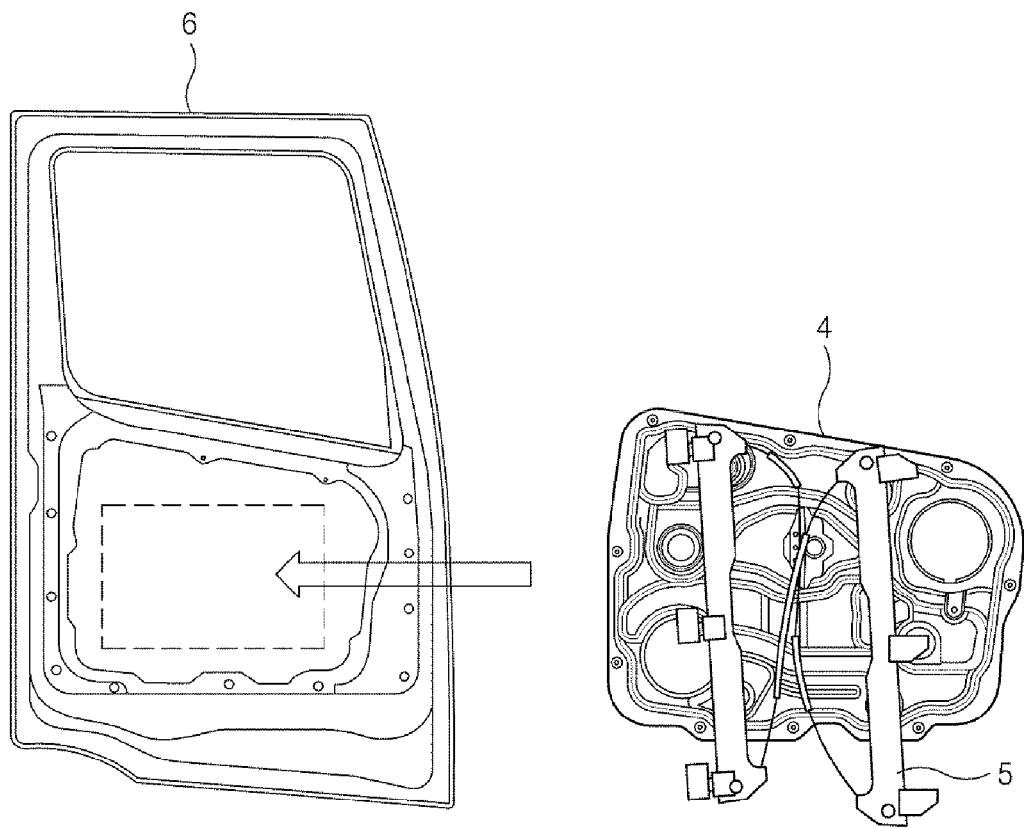
FIG. 2 is a front view of a module panel and a door panel to which the dual wire-type door window regulator according to the related art is applied.
Figure 3:
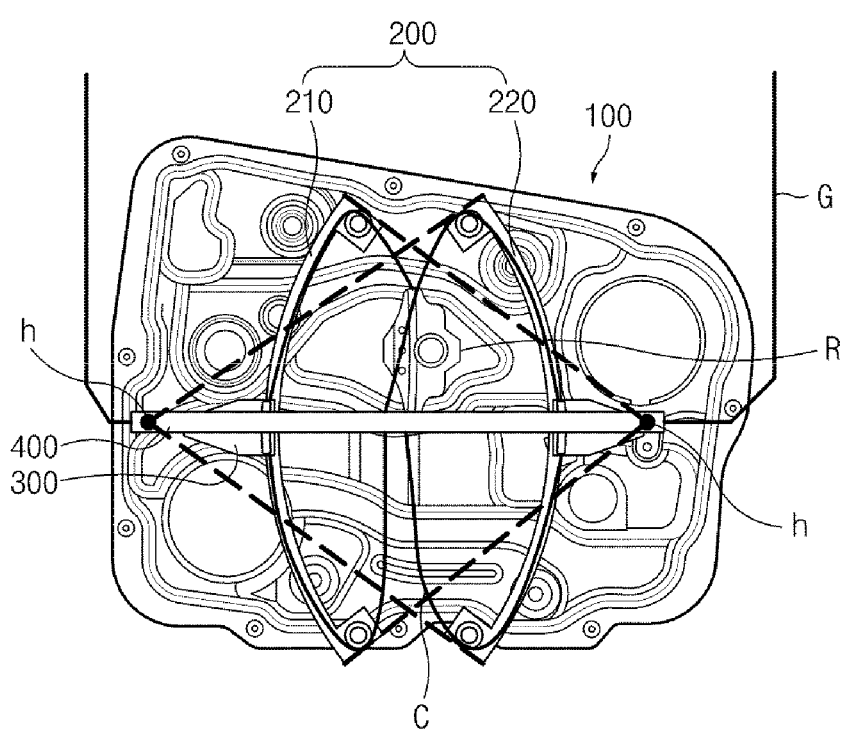
FIG. 3 is a perspective view illustrating a state in which a device for moving a window glass for a vehicle according to an exemplary embodiment of the present disclosure is mounted on a module panel.

The glass holder 400 is configured to be lengthily extended in a horizontal direction to support the window glass G. In addition, the glass holder 400 is installed to be movable in a vertical direction of a door panel 6 (see FIG. 2) for a vehicle in a state in which horizontality thereof is maintained.

Figure 4:
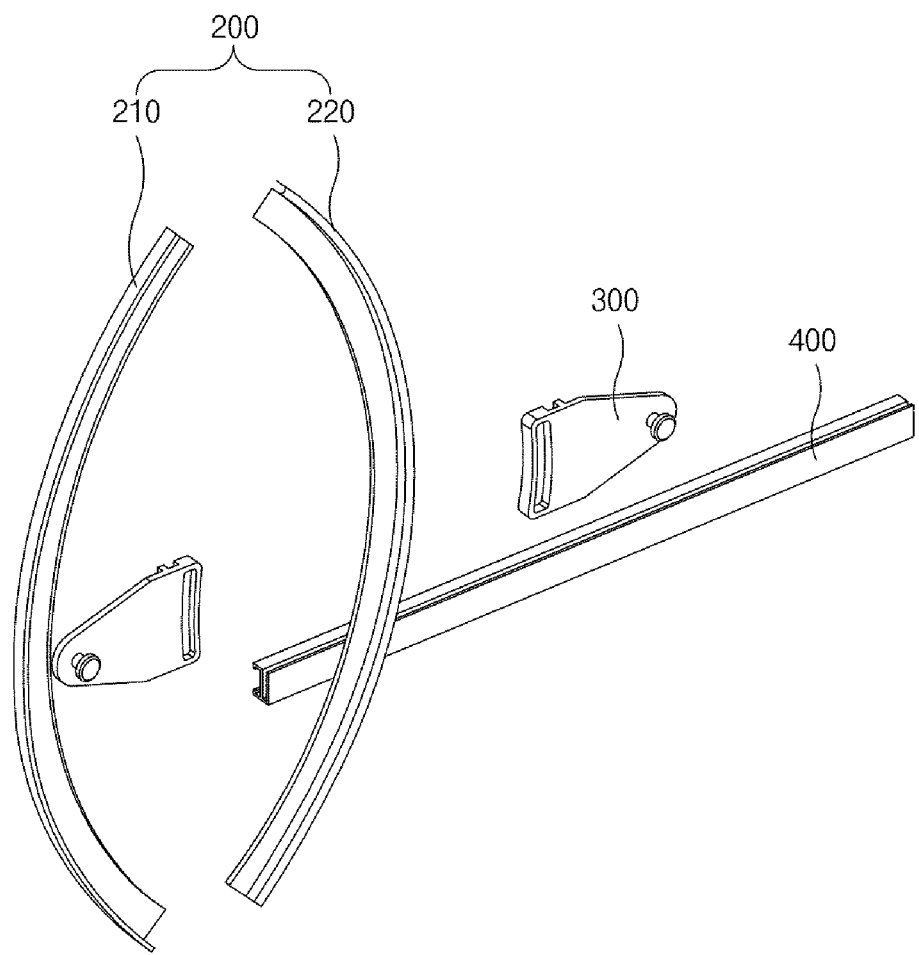
FIG. 4 is an exploded perspective view of the device for moving a window glass for a vehicle of FIG. 3.
Figure 5:
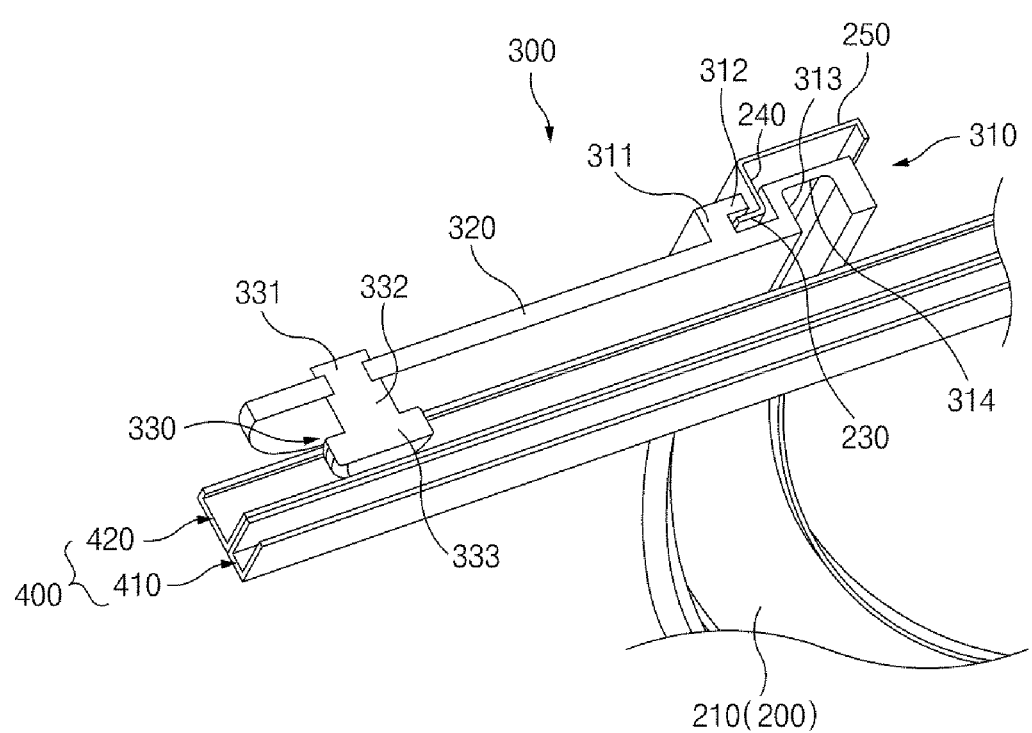
FIG. 5 is a main part perspective cross-sectional view of the device for moving a window glass for a vehicle of FIG. 3.
Figure 6:
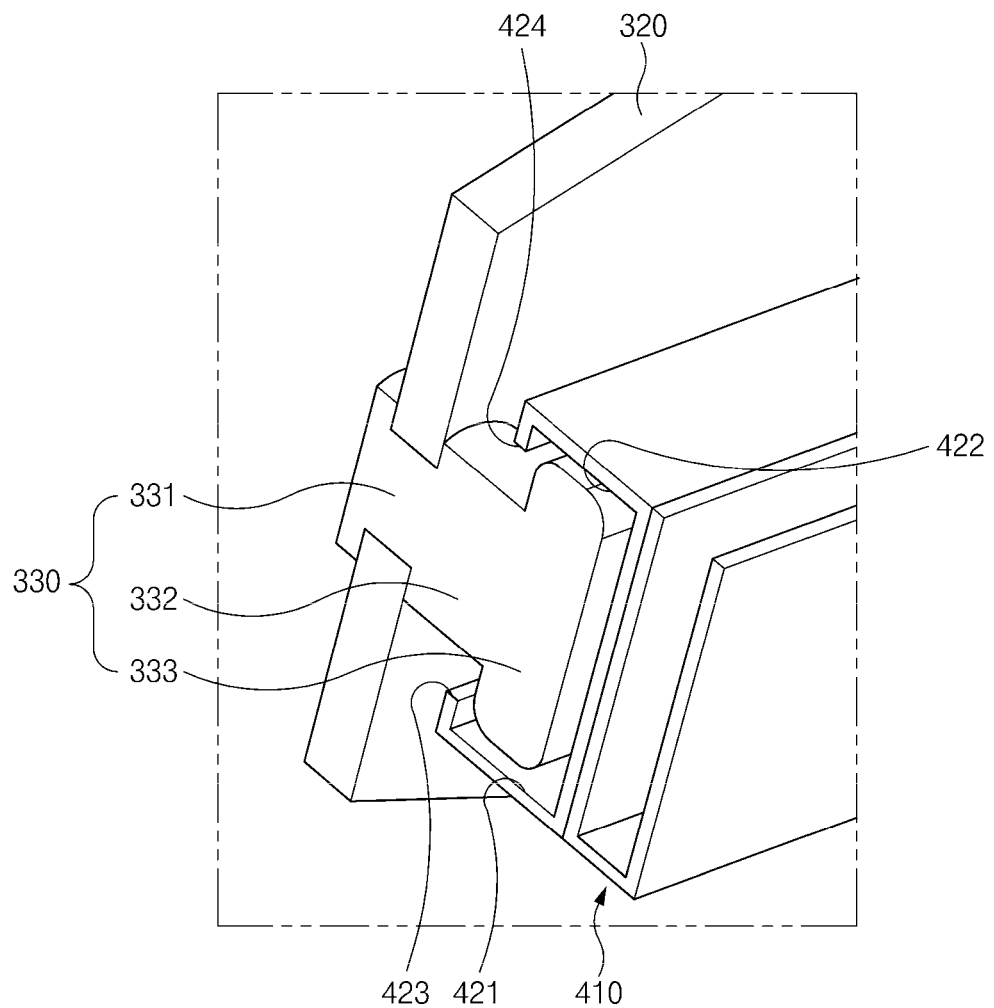
FIG. 6 is another main part perspective cross-sectional view of the device for moving a window glass for a vehicle of FIG. 3.

Referring to FIG. 4, FIG. 5 and FIG. 6, the glass holder 400 has a fitting portion 410 to which a lower end of the window glass G is fitted and a guide portion 420 adjacent to the fitting portion 410 and extended in the horizontal direction.

According to various exemplary embodiments, the glass holder 400 is installed to be movable in the vertical direction with respect to a module panel 100 mounted in the door panel for a vehicle.

The curved rail 200 is formed to have a curvature curved in a width direction of the module panel 100 and is disposed in a height direction of the module panel 100.

The curved rail 200 may be formed in an arc shape or an irregular arc shape.

According to various exemplary embodiments, the curved rail 200 is formed to be curved in the arc shape based on a virtual hinge shaft h.

According to various exemplary embodiments of the present disclosure, the curved rail 200 may have a first curved rail 210 and a second curved rail 220, and the first curved rail 210 and the second curved rail 220 may be mounted to be symmetrical to each other based on the center of the module panel 100.

A support plate 300 is connected between the curved rail 200 and the glass holder 400, and is configured so that one end thereof moves along the curvature of the curved rail 200 and the other end thereof is guided along the glass holder 400. The glass holder 400 may stably move in the vertical direction along the curved rail 200 while maintaining its horizontal state by the above-mentioned support plate 300.

The support plate 300 has a sliding portion 310 moving along the curvature of the curved rail 200 and a roller 330 guided along the guide portion 420 of the glass holder 400.

Figure 8A:
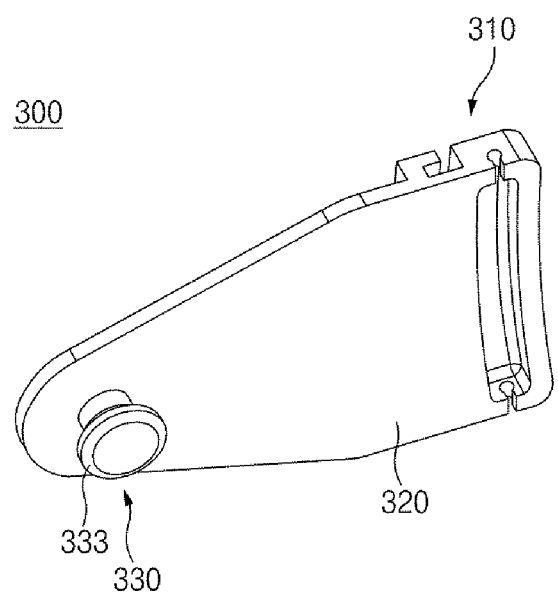

As illustrated in FIG. 8A, the support plate 300 may include a body portion 320, the sliding portion 310 provided at one end of the body portion 320 and moving along the curvature of the curved rail 200, 210 and 220, and the roller 330 provided at the other end of the body portion 320 and guided along the guide portion 420 of the glass holder 400.

Figure 8B:
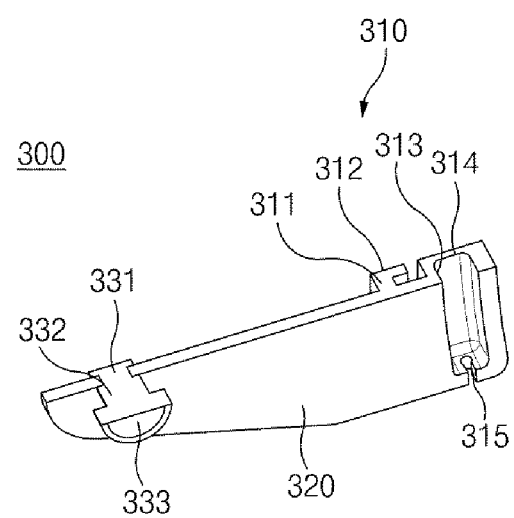

The sliding portion 310 may be mounted to be slidable on the curved rail 200, 210 and 220. The sliding portion 310 may include a first protruding portion 311 extended perpendicularly to the body portion 320, a first contact portion 312 extended from the first protruding portion 311 so as to be in parallel with the body portion 320, a second protruding portion 313 extended from the body portion 320 so as to be in parallel with the first protruding portion 311, and a second contact portion 314 extended from the second protruding portion 313 so as to be in parallel with the body portion 320, as illustrated in FIG. 8B.

Referring to FIG. 5, the first contact portion 312 is configured to contact one side wall 240 of the curved rail 200, 210 and 220, and the second contact portion 314 is configured to contact a bottom surface of the curved rail 200, 210 and 220. The first protruding portion 311, the first contact portion 312, and the second protruding portion 313 may define a predetermined guide space.

Figure 7:
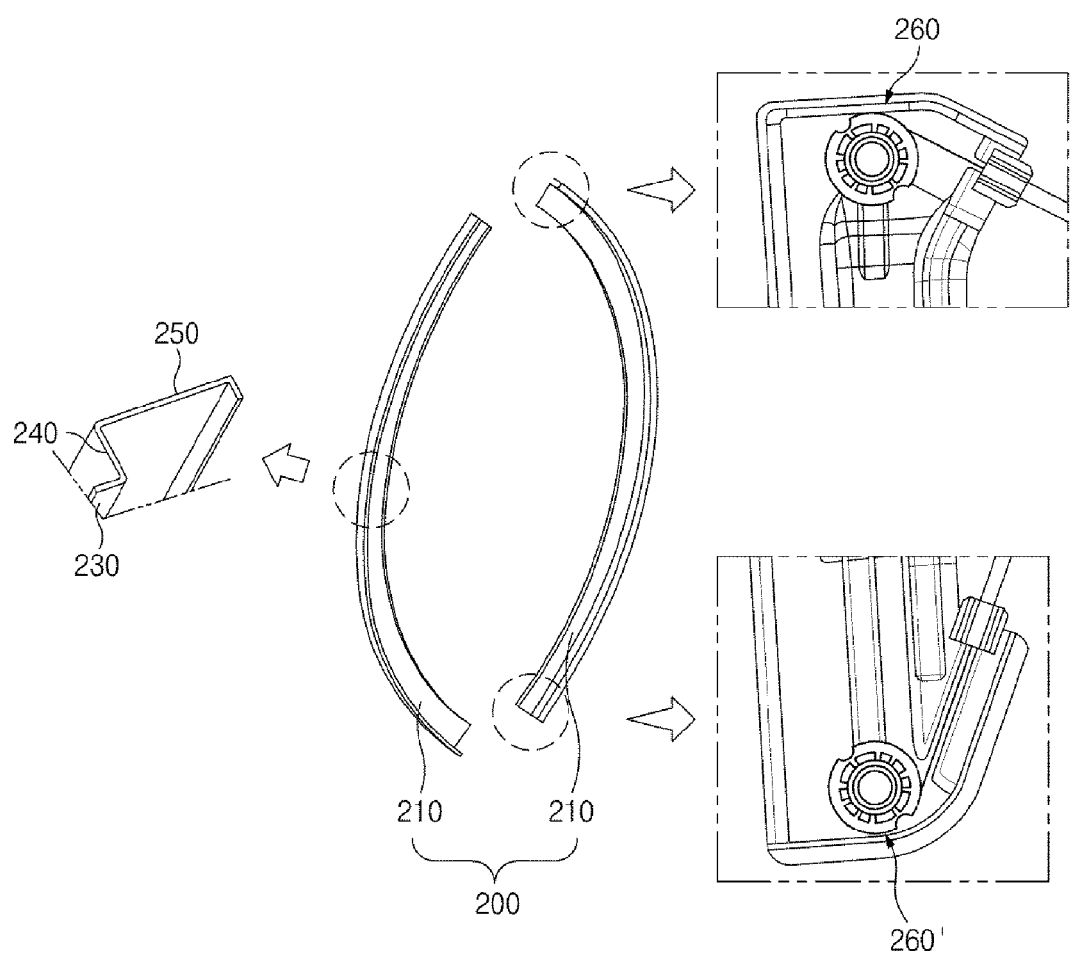
FIG. 7 is a perspective view and a main part enlarged view of a curved rail included in the device for moving a window glass for a vehicle of FIG. 3.

Referring to FIGS. 5 and 7, a guide protruding portion 230 may be formed on one side wall 240 of the curved rail 200, 210 and 220. The guide protruding portion 230 of the curved rail 200, 210 and 220 may be guided along the guide space defined by the first protruding portion 311, the first contact portion 312, and the second protruding portion 313.

The roller 330 may be installed to be rollable along the guide portion 420 of the glass holder 400, as illustrated in FIG. 5.

Referring to FIG. 6, the roller 330 has a penetration pin 331 penetrating through the body portion 320, a roller shaft 332 extended to one side of the penetration pin 331, and a roller portion 333 formed at one side of the roller shaft 332.

The roller shaft 332 has a diameter larger than that of the penetration pin 331, and the roller portion 333 has a diameter larger than that of the roller shaft 332 and is inserted into and installed in the guide portion 420 of the glass holder 400 to thereby be rolled along the guide portion 420.

Referring to FIG. 6, the guide portion 420 includes a bottom wall 421 and a top wall 423 that are extended from the fitting portion 410, a first separation preventing portion 422 protruding from the bottom wall 421 toward the top wall 423, and a second separation preventing portion 424 protruding from the top wall 423 toward the bottom wall 421. The first separation preventing portion 422 and the second separation preventing portion 424 may be spaced apart from each other by a gap corresponding to the diameter of the roller shaft 332, thereby making it possible to effectively prevent the roller 330 from being separated from the guide portion 420.

In an exemplary embodiment of the present disclosure, both ends of the curved rail 200 are provided with pulleys 260, a regulator R is installed on the module panel 100 of the door panel for a vehicle, and long wires C connected to the regulator R are wound around the pulleys 260. The regulator R is configured to generate power moving the long wires C to vertically move the glass holder 400 and the window glass G.

In addition, restricting structures, or the like, restricting a maximum raising height or a maximum lowering height of the glass holder 400 may also be installed at upper and lower portions of the module panel 100.

The long wires C may intersect with each other at the center of the module panel 100 so as to connect an upper end of the second curved rail 220 and a lower end of the first curved rail 210 to each other while connecting an upper end of the first curved rail 210 and a lower end of the second curved rail 220 to each other. As illustrated in FIG. 8B, a fixing portion 315 to which the long wires C are fixed may also be formed at the second contact portion 314 formed on the support plate 300.

The device for moving a window glass for a vehicle according to an exemplary embodiment of the present disclosure configured as described above is operated as illustrated in FIGS. 9 to 11.

Figure 9:
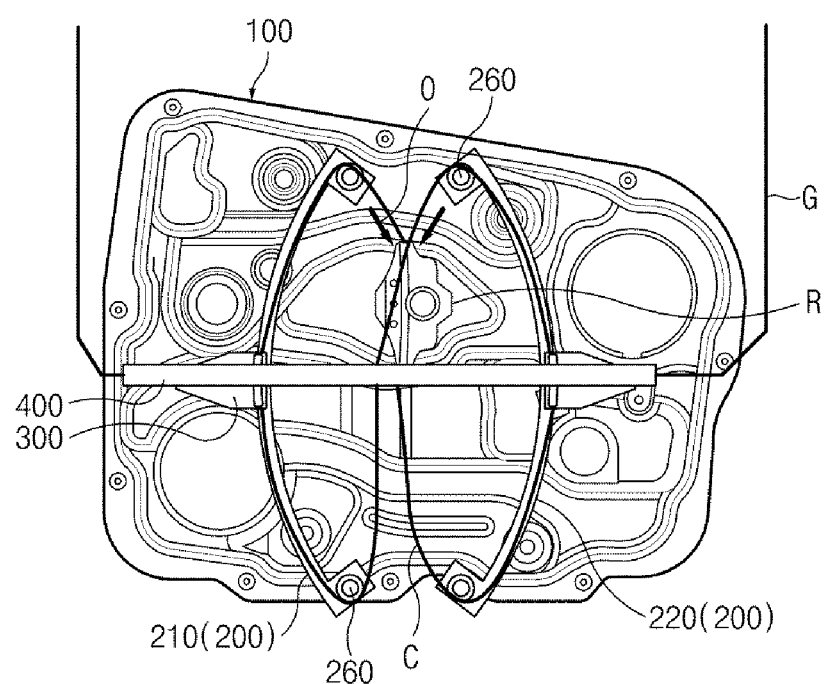
FIG. 9 is a view illustrating an example in which the device for moving a window glass for a vehicle of FIG. 3 is installed.
Figure 10:
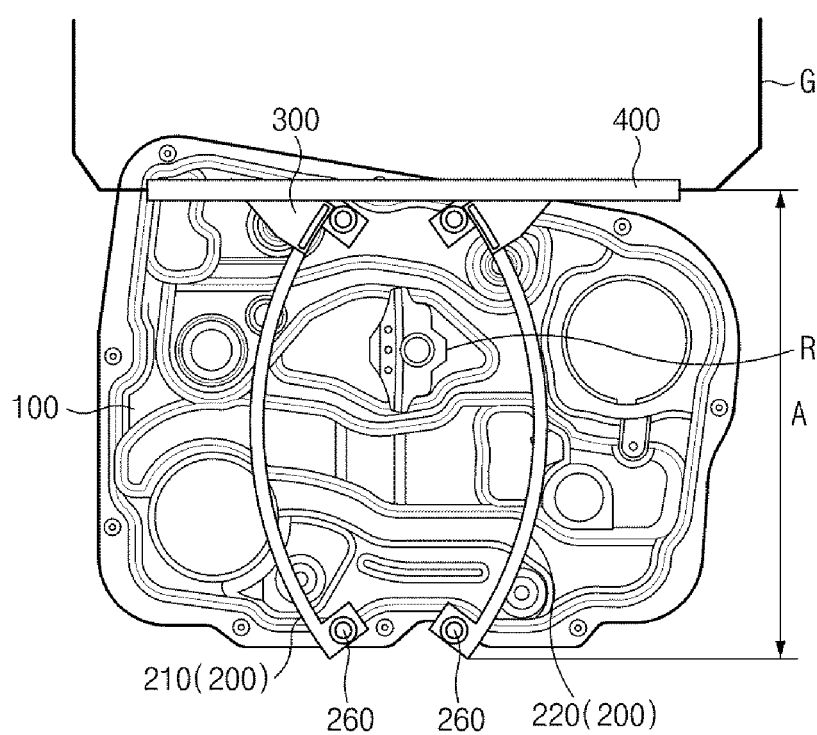
FIG. 10 is a view illustrating an operation state of the device for moving a window glass for a vehicle of FIG. 9.

When the long wires C move in an arrow direction O as illustrated in FIG. 9, the support plate 300 connected to the long wires C moves upwardly depending on the curvature of the curved rail 200, as illustrated in FIG. 10. Here, since the curved rail 200 has the arc shape, as the support plate 300 rises, an end portion of the support plate 300 on which the roller 330 is installed may be directed upwardly (see FIG. 10).

Figure 11:
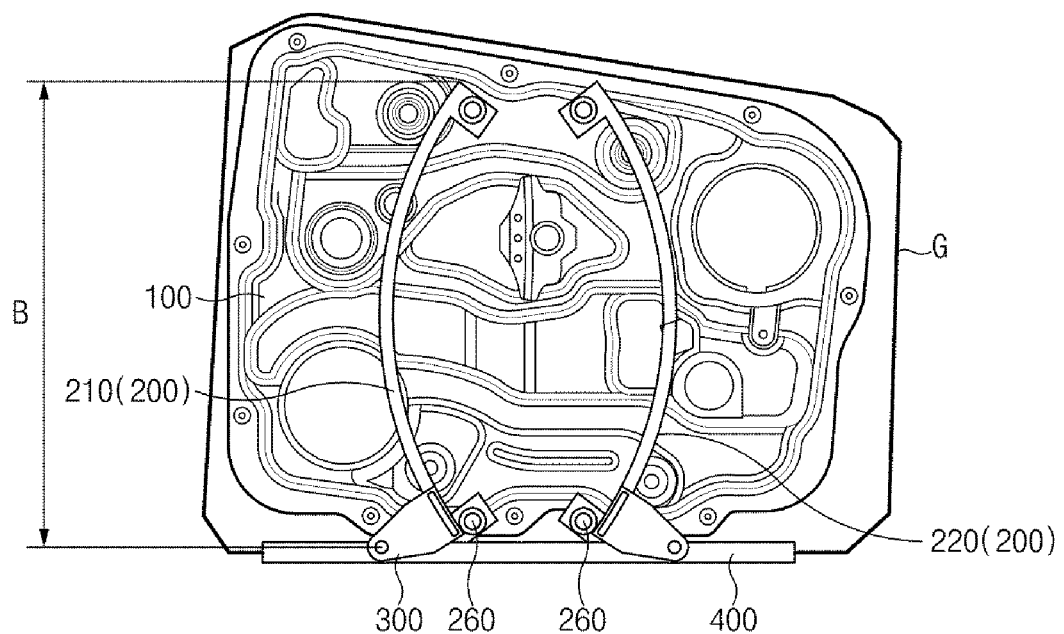
FIG. 11 is another view illustrating an operation state of the device for moving a window glass for a vehicle of FIG. 9.

When the long wires C move in an opposite direction to the arrow direction O, the support plate 300 moves downwardly, as illustrated in FIG. 11. Here, since the curved rail 200 has the arc shape, as the support plate 300 falls, the end portion of the support plate 300 on which the roller 330 is installed may be directed downwardly (see FIG. 11).

A movement range of the support plate 300 is increased or decreased depending on a curved degree of the curved rail 200. It is preferable that the curved rail 200 is manufactured to have a large curvature at a central portion thereof and have a small curvature at an upper end or a lower end thereof in order to obtain a larger movement range of the support plate 300. In this case, since a larger relative angle of the support plate 300 is generated, a vertical position movement range A (see FIG. 10) of the glass holder is increased in proportion to a vertical movement distance B (see FIG. 11) of the support plate 300.

As described above, in the device for moving a window glass for a vehicle according to an exemplary embodiment of the present disclosure, the curved rail on which the curvature is formed is used, such that the curved rail does not protrude downwardly of the module panel.

In addition, since the curved rail does not protrude downwardly of the module panel, the module panel is simply mounted in the door panel, such that an assembly property is improved.

Further, since the curved rail does not protrude downwardly of the module panel, an entire area is decreased, such that a conveyance property is improved. A package box is decreased, and the possibility of collision at the time of movement is decreased.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A device for moving a window glass for a vehicle, comprising:
   a glass holder disposed on a door panel for the vehicle and supporting the window glass;
   a curved rail guiding vertical movement of the glass holder and curved to form a hinge shaft; and
   a support plate connecting the curved rail and the glass holder to each other,
   wherein a first end of the support plate moves along a curvature of the curved rail and a second end of the support plate is guided along the glass holder,
   wherein the support plate includes:
      a body portion;
      a sliding portion provided at a first end of the body portion and moving along a curvature of the curved rail; and
      a roller provided at a second end of the body portion and guided along the glass holder,
   wherein the glass holder includes:
      a fitting portion to which the window glass is fitted; and
      a guide portion adjacent to the fitting portion and guiding the roller, and
   wherein the roller includes:
      a penetration pin penetrating through the body portion;
      a roller shaft extended from the penetration pin and having a diameter larger than that of the penetration pin; and
      a roller portion formed at a side of the roller shaft, having a diameter larger than a diameter of the roller shaft, and inserted into and guided by the guide portion of the glass holder.

2. The device for moving the window glass for the vehicle according to claim 1, wherein the curved rail includes a first curved rail and a second curved rail disposed to be symmetrical to each other.

3. The device for moving the window glass for the vehicle according to claim 1, wherein the guide portion has at least one separation preventing portions preventing separation of the roller.

4. The device for moving the window glass for the vehicle according to claim 3, wherein the sliding portion includes:
   a first protruding portion extended perpendicularly to the body portion;
   a first contact portion extended from the first protruding portion to be in parallel with the body portion;
   a second protruding portion extended from the body portion to be in parallel with the first protruding portion; and
   a second contact portion extended from the second protruding portion to be in parallel with the body portion.

5. The device for moving the window glass for the vehicle according to claim 4,
   wherein both ends of the curved rail are provided with pulleys,
   wherein a regulator is installed on the door panel for the vehicle, and
   wherein wires connected to the regulator are wound around the pulleys.

6. The device for moving the window glass for the vehicle according to claim 5, wherein the wires intersect with each other to connect an upper end of the second curved rail and a lower end of the first curved rail to each other while connecting an upper end of the first curved rail and a lower end of the second curved rail to each other.

7. The device for moving the window glass for the vehicle according to claim 5, wherein the second contact portion has a fixing portion to which the wires are fixed.

8. A device for moving a window glass for a vehicle, comprising:
   a module panel mounted in a door panel for the vehicle;
   a curved rail formed to have a curvature toward a side of the module panel in a width direction and mounted in a height direction of the module panel;
   a support plate mounted on the curved rail to move along the curved rail; and a glass holder supporting the window glass and vertically moving in a state in which horizontality thereof is maintained depending on movement of the support plate, wherein the support plate includes:
- a body portion;
- a sliding portion provided at a first end of the body portion and moving along a curvature of the curved rail; and
- a roller provided at a second end of the body portion and guided along the glass holder, wherein the glass holder includes:
- a fitting portion to which the window glass is fitted; and
- a guide portion adjacent to the fitting portion and guiding the roller, and wherein the roller includes:
- a penetration pin penetrating through the body portion;
- a roller shaft extended from the penetration pin and having a diameter larger than that of the penetration pin; and
- a roller portion formed at a side of the roller shaft, having a diameter larger than a diameter of the roller shaft, and inserted into and guided by the guide portion of the glass holder.

* * * * *